April 9, 1940. T. M. RAGAN 2,196,668
PACKING FOR WELL DEVICES
Filed April 21, 1939
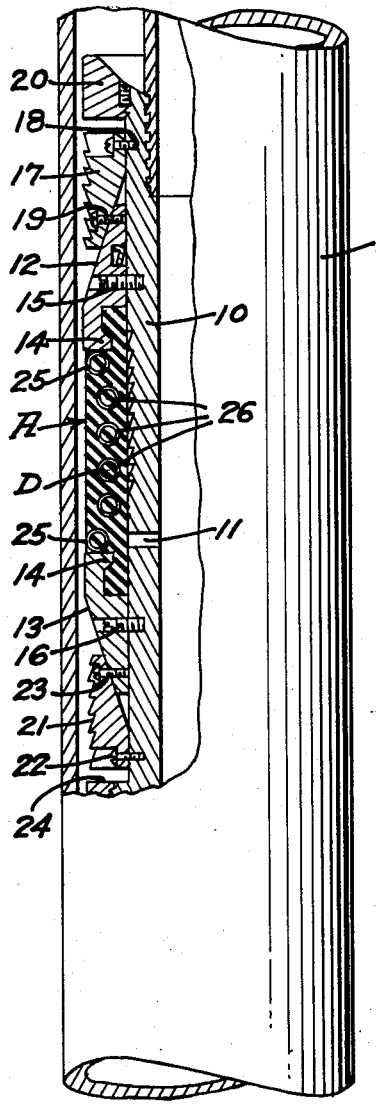
Fig.1.
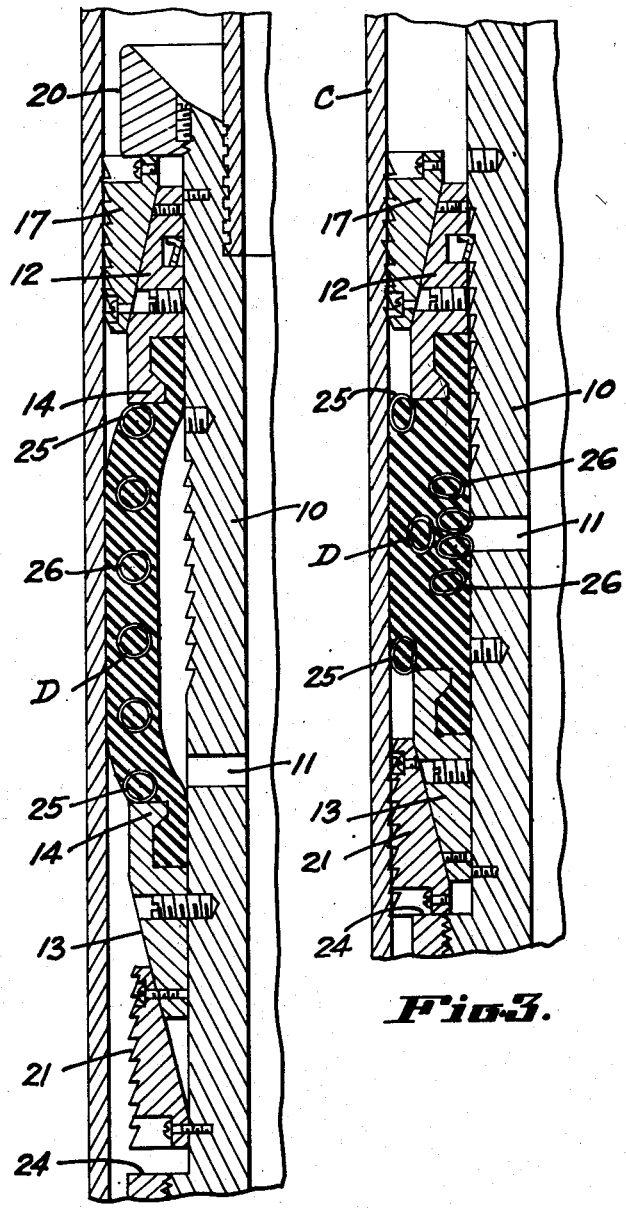
Fig.2.
Fig.3.
INVENTOR.
THOMAS M. RAGAN
BY Oscar A. Mellin
ATTORNEY Patented Apr. 9, 1940

2,196,668

UNITED STATES PATENT OFFICE 2,196,668

PACKING FOR WELL DEVICES

Thomas M. Ragan, Downey, Calif., assignor to Baker Oil Tools, Inc., Huntington Park, Calif., a corporation of California Application April 21, 1939, Serial No. 269,113

16 Claims. (Cl. 166—12)

This invention relates primarily to resilient expansible packings and is more particularly directed to that general type of packing sleeves usually employed in well devices to pack off the interior of a well casing.

In deep wells, particularly oil wells, devices of this character, such as cement retainers, bridge plugs, production packers and other well packing devices, usually include a tubular body carrying an annular packing sleeve normally in collapsed condition and adapted to be lowered into a well casing and set therein in a position of use in which the packing sleeve of rubber or other like material is by axial compression expanded radially to engage the casing wall to form a fluid tight seal.

In order to safely lower such a device through a well casing past the joints thereof and through portions of a casing which may be more or less crooked or out of round, it is necessary that its normal collapsed external diameter be appreciably less than the internal diameter of the casing in which it is to be used, so as to provide sufficient annular clearance to prevent binding or fouling of the device during its passage through the casing.

Thus, the packing is normally spaced from the casing wall and in subsequently effecting a pack-off it must bridge such clearance space. A commonly employed means for expanding the packing sleeve involves opposed relatively longitudinally movable members which function to axially compress said sleeve so that it bridge the annular clearance space and become tightly packed in the packing zone between the casing wall and the body of the packing device.

With the use of a packing sleeve formed of rubber or like material, which is sufficiently pliable to be thus expanded by axial compression, it frequently happens that the rubber will squeeze past the opposed compressing members to escape from the packing zone to a degree preventing the forming of a tight fluid seal.

In certain types of well packers an initial expansion of the packing sleeve is effected by fluid pressure through passages leading from the bore of the packer body to the inner side of said sleeve and in such devices, when the packing sleeve is subsequently axially compressed, there will often be an undesirable flow of the packing rubber through said passages.

The principal object of the present invention is to provide an improved resilient packing sleeve formed of relatively pliable packing material and capable of being diametrically expanded by axial compression to bridge an annular clearance space and form a fluid tight seal with a casing wall, and having embedded in its structure pliable reinforcing means adapted to flex with the packing material and being so disposed therein as to prevent an escaping flow of the packing material from the packing zone.

The invention is exemplified in the following description and illustrated by way of example in the accompanying drawing in which:

Fig. 1 is an elevation of a portion of a well casing, partly in section and showing a packing device disposed in normal condition therein and provided with a packing sleeve constructed in accordance with the present invention.

Fig. 2 is a detail section illustrating a partially operated condition of the packer in which the packing sleeve is initially expanded by internal pressure to set the upper anchoring slips.

Fig. 3 is a similar detail section illustrating a fully operated condition of the packer.

In the drawing my improved packing sleeve A is shown incorporated in a well packer B of the general character disclosed in the application of John H. Grubb filed January 14, 1939, under Serial No. 250,952, and which includes a tubular body 10 adapted to be connected to the lower end of a tubing string and lowered thereby into a well casing C, said body providing an axial flow passage and having one or more lateral ports 11 for directing fluid under pressure from said flow passage to in back of the surrounding packing sleeve A to initially expand said sleeve.

The packing sleeve A is similarly formed at opposite ends to connect to upper and lower slip expanding cones 12 and 13 respectively, each end of said sleeve having an annular externally beaded anchoring projection 14 engaged within a companion internally grooved recess formed in the adjacent cone. Normally, these cones 12 and 13 are connected to the body 10 by shear pins 15 and 16, respectively, the pins 16 of the lower cone having a greater shear value than the pins 15 of the upper cone so that a lesser force is required to release the upper cone than that required to release the lower cone.

Upper casing gripping slips 17 are normally connected to the body 10 in collapsed position by shear pins 18 and to the upper cone 12 by shear pins 19, and above said slips the body is provided with an upper abutment collar 20. Lower casing gripping slips 21 are normally disposed in collapsed position and are connected to the body by shear pins 22 and to the lower cone 13 by shear pins 23, and below the lower slips 21 the body is enlarged to provide a lower abutment shoulder 24, as shown in Fig. 1.

The packing sleeve A is formed of relatively pliable rubber or other packing material of similar character and has embedded therein pliable reinforcing means preferably in the form of coil springs D. Each of these springs have their opposite ends locked together so as to form a complete circular flexible ring, and in the preferred arrangement said rings are distributed in the manner shown in Fig. 1, there being a reinforcing ring 25 disposed closely adjacent each peripherial outer corner at each end of the packing sleeve proper, and an inner series of longitudinally spaced reinforcing rings 26 disposed in the body of the sleeve between the end rings 25.

Obviously, since these reinforcing springs are embedded in the material of which the packing sleeve is constructed, they will be entirely supported thereby and will expand and be otherwise flexed in conformity with expansion and flexation of the sleeve and will, under axial compression of said sleeve, be relatively shifted in conformity with displacement of the material in which they are embedded.

In practice, the packing device A, conditioned as shown in Fig. 1, is lowered into the well casing C to a position of use. It will be observed that when the device is in its normal collapsed condition there is an appreciable degree of clearance between it and the wall of the well casing.

With the packer thus lowered to a position of use, a suitable means may be sent down the tubing string to bridge the fluid passage below the lateral ports 11. Fluid pressure subsequently built up in the fluid passage will be effective through said ports to initially expand and elongate the packing sleeve A and shear the pins 15 and 18 to release the upper cone 12 and the upper slips 17 from the body 10 and contact said slips with the abutment collar 20, the cone 12 moving upwards with sufficient force to shear the pins 19 to release said upper slips from the upper cone. With the shearing of the slip pins 19, the upper slips will, by reason of the co-engaging angled surfaces of the cone and slips, be radially expanded to gripping engagement with the casing wall, as shown in Fig. 2.

The pump pressure is then relieved and the tubing string is subjected to an upward strain sufficient to move the body 10, the lower cone 13, the lower slips 21 and the lower end of the packing sleeve A relative to the now stationary upper end of said packing sleeve, so as to axially compress the packing sleeve into sealing condition against the casing wall and the packer body until it will compress no further, whereupon, continued upward strain will shear the pins 16 of the lower cone 13, causing the abutment shoulder 24 to engage the lower slips 21 and then shear the pins 22 and 23 and move said lower slips upwardly and outwardly on the now stationary lower cone and into gripping engagement with the casing to complete the setting and anchoring of the packing device in the casing, as shown in Fig. 3.

It will be understood that since the packing sleeve has been so firmly compressed as to serve as a backing for the shearing of the lower slip pins, its engagement with the unmachined casing wall will be a gripping engagement, or distinguished from a sliding engagement such as is had by packings of pistons and other reciprocating elements.

By an examination of Fig. 3 of the drawing, it will be noted that the reinforcing springs 25 at the opposite outer corners of the packing sleeve A have expanded with expansion of the end portions of the sleeve and have been forcefully packed at these points to bridge the clearance space, this packing force and the flowing tendency of the packing material tending to tip the spring convolutions circularly upon each other to form a more or less complete circular barrier preventing an escaping flow of the packing material from the packing zone. This circular tilting of the spring convolutions will cause them to have a somewhat oval appearance when viewed from a transverse section as shown in Fig. 3.

Under the axial compression of the packing sleeve the intermediate reinforcing springs 26 will, in a somewhat similar manner, be concentrated adjacent the lateral ports 11 to prevent flow of the packing material through said ports.

From the aforegoing it will be evident that the present invention provides a very efficient and reliable packing element for the purposes described. While I have shown the preferred form of my invention, it is to be understood that various changes may be made in its construction by those skilled in the art without departing from the spirit of the invention as defined in the appended claims.

Having thus described my invention, what I claim and desire to obtain by Letters Patent is:

1. In combination, a body adapted to be positioned within a well casing, a cylindrical packing sleeve surrounding said body and having a normal diameter smaller than the bore of said casing to provide an appreciable intermediate clearance space, said sleeve defining a packing zone and being formed of pliable resilient packing material, opposed members engaging the opposite ends of the packing sleeve and relatively moveable longitudinally to axially compress said sleeve to an increased diameter to engage said casing wall and form a tight fluid seal, and circularly disposed flexible reinforcing means embedded in the opposite end portions of said sleeve and capable of bridging said clearance space to prevent an escaping flow of said packing material from the packing zone.

2. In combination, a body adapted to be positioned within a well casing, a cylindrical packing sleeve surrounding said body and having a normal diameter smaller than the bore of said casing to provide an appreciable intermediate clearance space, said sleeve defining a packing zone and being formed of pliable resilient packing material, opposed members engaging the opposite ends of the packing sleeve and relatively moveable longitudinally to axially compress said sleeve to an increased diameter to engage said casing wall and form a tight fluid seal, and circularly disposed flexible reinforcing means embedded in the opposite end portions of said sleeve and capable of bridging said clearance space to prevent an escaping flow of said packing material from the packing zone, each of said reinforcing means comprising a helically coiled wire bent to circular form and having its terminal ends connected to form a complete circle.

3. In combination, a body adapted to be positioned within a well casing, a cylindrical packing sleeve surrounding said body and having a normal diameter smaller than the bore of said casing to provide an appreciable intermediate clearance space, said sleeve defining a packing zone and being formed of pliable resilient packing material, opposed members engaging the opposite ends of the packing sleeve and relatively moveable longitudinally to axially compress said sleeve to an increased diameter to engage said casing wall and for a tight fluid seal, and circularly disposed flexible reinforcing means embedded in the opposite end portions of said sleeve and capable of bridging said clearance space to prevent an escaping flow of said packing material from the packing zone, each of said reinforcing means comprising a helical spring of circular shape having its terminal ends joined to form a complete circle.

4. In combination, a body adapted to be positioned within a well casing, a cylindrical packing sleeve surrounding said body and having a normal diameter smaller than the bore of said casing to provide an appreciable intermediate clearance space, said sleeve defining a packing zone and being formed of pliable resilient packing material, opposed members engaging the opposite ends of the packing sleeve and relatively moveable longitudinally to axially compress said sleeve to an increased diameter to engage said casing wall and form a tight fluid seal, said members and the opposite ends of said sleeve being provided with co-engaging connecting means, and circularly disposed flexible reinforcing means embedded in the opposite end portions of said sleeve and capable of bridging said clearance space to prevent an escaping flow of said packing material from the packing zone.

5. In combination, a body adapted to be positioned within a well casing, a cylindrical packing sleeve surrounding said body and having a normal diameter smaller than the bore of said casing to provide an appreciable intermediate clearance space, said sleeve defining a packing zone and being formed of pliable resilient packing material, opposed members engaging the opposite ends of the packing sleeve and relatively moveable longitudinally to axially compress said sleeve to an increased diameter to engage said casing wall and form a tight fluid seal, said sleeve at its opposite ends having a beaded annular projection engaged in a complementary grooved recess in the adjacent member, and circularly disposed flexible reinforcing means embedded in the opposite end portions of said sleeve and capable of bridging said clearance space to prevent an escaping flow of said packing material from the packing zone.

6. In combination, a tubular body providing a flow passage and having a lateral port communicating with said flow passage, said body being adapted to be positioned in a well casing, a cylindrical packing sleeve surrounding said body and normally covering said port and having a normal diameter smaller than the bore of said casing to provide an appreciable intermediate clearance space, said sleeve defining a packing zone and being formed of pliable resilient packing material capable of being initially expanded by fluid pressure transmitted through said port to the inner surface of the sleeve, opposed members connected to the opposite ends of said packing sleeve and relatively moveable longitudinally to axially compress and diametrically expand said sleeve to tightly contact the casing wall to form therewith a fluid tight seal, circularly disposed flexible reinforcing means embedded in the opposite end portions of said sleeve and capable of bridging said clearance space to prevent an escaping flow of said packing material from the packing zone, and other similar reinforcing means embedded in the intermediate portion of said packing sleeve in position to bridge said lateral port to prevent an escaping flow of packing material therethrough.

7. In combination, a tubular body providing a flow passage and having a lateral port communicating with said flow passage, said body being adapted to be positioned in a well casing, a cylindrical packing sleeve surrounding said body and normally covering said port and having a normal diameter smaller than the bore of said casing to provide an appreciable intermediate clearance space, said sleeve defining a packing zone and being formed of pliable resilient packing material capable of being initially expanded by fluid pressure transmitted through said port to the inner surface of the sleeve, opposed members connected to the opposite ends of said packing sleeve and relatively moveable longitudinally to axially compress and diametrically expand said sleeve to tightly contact the casing wall to form therewith a fluid tight seal, circularly disposed flexible reinforcing means embedded in the opposite end portions of said sleeve and capable of bridging said clearance space to prevent an escaping flow of said packing material from the packing zone, and other similar reinforcing means embedded in the intermediate portion of said packing sleeve in position to bridge said lateral port to prevent an escaping flow of packing material therethrough, each of said reinforcing means comprising a helically coiled wire bent to circular form and having its terminal ends connected to form a complete circle.

8. In combination, a tubular body providing a flow passage and having a lateral port communicating with said flow passage, said body being adapted to be positioned in a well casing, a cylindrical packing sleeve surrounding said body and normally covering said port and having a normal diameter smaller than the bore of said casing to provide an appreciable intermediate clearance space, said sleeve defining a packing zone and being formed of pliable resilient packing material capable of being initially expanded by fluid pressure transmitted through said port to the inner surface of the sleeve, opposed members connected to the opposite ends of said packing sleeve and relatively moveable longitudinally to axially compress and diametrically expand said sleeve to tightly contact the casing wall to form therewith a fluid tight seal, circularly disposed flexible reinforcing means embedded in the opposite end portions of said sleeve and capable of bridging said clearance space to prevent an escaping flow of said packing material from the packing zone, and other similar reinforcing means embedded in the intermediate portion of said packing sleeve in position to bridge said lateral port to prevent an escaping flow of packing material therethrough, each of said reinforcing means comprising a helical spring of circular-shape having its terminal ends joined to form a complete circle.

9. A cylindrical packing sleeve formed of pliable resilient packing material and having embedded therein pliable reinforcing elements of circular form, one thereof being disposed in each end portion of said sleeve and others thereof being disposed in the intermediate portion of said sleeve in longitudinally spaced relationship, each of said reinforcing elements comprising a helically coiled wire bent to circular form and having its terminal ends joined to form a complete circle.

10. A cylindrical packing sleeve formed of pliable resilient packing material and having embedded therein pliable reinforcing elements of circular form, one thereof being disposed in each end portion of said sleeve and others thereof being disposed in the intermediate portion of said sleeve in longitudinally spaced relationship, each of said reinforcing elements comprising a helical spring of circular shape having its terminal ends joined to form a complete circle.

11. A cylindrical packing sleeve formed of pliable resilient packing material and having embedded in its opposite end portions pliable reinforcing elements each comprising a helically coiled flexible wire bent to circular form and having its terminal ends joined to form a complete circle, said packing sleeve having at each end a beaded annular projection adapting said sleeve to be connected to adjacent packing compressing members.

12. A packing structure for a body adapted to be lowered into a well casing and having an annular packing engaging member of an external diameter appreciably less than the bore of said casing to provide therebetween a substantial clearance space permitting free passage thereof down the casing; said packing structure comprising a cylindrical packing sleeve formed of pliable resilient material and having a normal external diameter comparable to that of said annular body member, said packing sleeve being adapted to surround said body adjacent said annular member to define a packing zone, and a circularly disposed flexible reinforcing means embedded in the packing sleeve adjacent said annular body member and closely adjacent the outer peripheral surface of said sleeve, said sleeve being axially compressible and transversely expansible to bridge said clearance space and to expand said reinforcing means into contacting engagement with the casing wall and said annular body member to prevent escaping flow of said packing material from said packing zone.

13. A packing structure for a body adapted to be lowered into a well casing and having an annular packing engaging member of an external diameter appreciably less than the bore of said casing to provide therebetween a substantial clearance space permitting free passage thereof down the casing; said packing structure comprising a cylindrical packing sleeve formed of pliable resilient material and having a normal external diameter comparable to that of said annular body member, said packing sleeve being adapted to surround said body adjacent said annular member to define a packing zone, a circularly disposed flexible reinforcing means embedded in the packing sleeve adjacent said annular body member and closely adjacent the outer peripheral surface of said sleeve, said sleeve being axially compressible and transversely expansible to bridge said clearance space and to expand said reinforcing means into contacting engagement with the casing wall and said annular body member to prevent escaping flow of said packing material from said packing zone, said reinforcing means comprising a helically coiled flexible wire bent to circular form and having its terminal ends joined to form a complete circle.

14. A packing structure for a body adapted to be lowered into a well casing and having opposed relatively longitudinally movable annular packing engaging members of similar external diameter appreciably less than the bore of said casing to provide therebetween a substantial clearance space permitting free passage thereof down the casing; said packing structure comprising a cylindrical packing sleeve formed of pliable resilient material and having a normal external diameter comparable to that of said annular body members, said packing sleeve being adapted to surround said body between said annular body members to define a packing zone, and circularly disposed flexible reinforcing means embedded in the opposite end portions of said packing sleeve adjacent the respective annular body members and closely adjacent the outer peripheral surface of said sleeve, said sleeve being capable of axial compression by relative compressive movement of said annular body members to diametrically expand said sleeve to an increased diameter bridging said clearance space to form a fluid-tight seal with the casing wall, the flow of the packing material under such compression expanding said reinforcing means into contacting engagement with the casing wall and the respective annular body members to prevent escaping flow of said packing material from the opposite ends of the packing zone.

15. A packing structure for a tubular body adapted to be lowered into a well casing and having opposed relatively longitudinally movable annular packing engaging members of similar external diameter appreciably less than the bore of said casing to provide therebetween a substantial clearance space permitting free passage thereof down the casing, which body provides a flow passage and has between said annular members a lateral port communicating with said passage; said packing structure comprising a cylindrical packing sleeve formed of pliable resilient packing material and having a normal external diameter comparable to that of said annular body members, said sleeve being adapted to surround said body over said port and between said annular members to define a packing zone, and circularly disposed flexible reinforcing means embedded in the opposite end portions of said packing sleeve adjacent the respective annular body members and closely adjacent the outer peripheral surface of said sleeve, said sleeve being capable of being initially expanded by fluid pressure transmitted through said body port and of being subsequently compressed by relative compressive movement of said annular members to expand and compact the packing material so as to bridge said clearance space and form a fluid-tight seal between said body and the casing wall, the flow of the packing material under such compression expanding said reinforcing means into contacting engagement with the casing wall and the adjacent annular body members to prevent escape of said packing material from the opposite ends of said packing zone.

16. A packing structure for a tubular body adapted to be lowered into a well casing and having opposite relatively longitudinally movable annular packing engaging members of similar external diameter appreciably less than the bore of said casing to provide therebetween a substantial clearance space permitting free passage thereof down the casing, which body provides a flow passage and has between said annular members a lateral port communicating with said passage; said packing structure comprising a cylindrical packing sleeve formed of pliable resilient packing material and having a normal external diameter comparable to that of said annular body members, said sleeve being adapted to surround said body over said port and between said annular members to define a packing zone, outer circularly disposed flexible reinforcing means embedded in the opposite end portions of said packing sleeve adjacent the respective annular body members and closely adjacent the outer peripheral surface of said sleeve, and independent intermediate circularly disposed flexible reinforcing means embedded in the body portion of said sleeve in longitudinally spaced relationship, said sleeve being capable of being initially expanded by fluid pressure transmitted through said body port and of being subsequently compressed by relative compressive movement of said annular members to expand and compact the packing material so as to bridge said clearance space and form a fluid-tight seal between said body and the casing wall, the flow of the packing material under such compression expanding said outer reinforcing means into contacting engagement with the casing wall and the adjacent annular body members to prevent escape of said packing material from the opposite ends of said packing zone, said flow of the packing material also translating said intermediate reinforcing means towards said body port to bridge said port and prevent escape of packing material therethrough.

THOMAS M. RAGAN.